United States Patent
Mateo Rodriguez et al.

(10) Patent No.: US 9,735,914 B2
(45) Date of Patent: Aug. 15, 2017

(54) MECHANISM FOR TRAFFIC PRIVACY IN RECONFIGURABLE ADD/DROP MULTIPLEXER BASED SUBMARINE NETWORKS

(71) Applicants: NEC Laboratories America, Inc., Princeton, NJ (US); NEC Corporation, Tokyo (JP)

(72) Inventors: Eduardo F. Mateo Rodriguez, Tokyo (JP); Philip N. Ji, Cranbury, NJ (US); Ryuji Aida, Tokyo (JP)

(73) Assignee: NEC Corporation (JP)

( * ) Notice: Subject to any disclaimer, the term of this patent is extended or adjusted under 35 U.S.C. 154(b) by 143 days.

(21) Appl. No.: 14/808,094

(22) Filed: Jul. 24, 2015

(65) Prior Publication Data
US 2016/0028502 A1 Jan. 28, 2016

Related U.S. Application Data

(60) Provisional application No. 62/028,873, filed on Jul. 25, 2014.

(51) Int. Cl.
H04J 14/00 (2006.01)
H04J 14/02 (2006.01)
(Continued)

(52) U.S. Cl.
CPC ............ *H04J 14/0212* (2013.01); *H04B 3/52* (2013.01); *H04Q 11/0005* (2013.01); *H04Q 11/0062* (2013.01); *H04Q 2011/0016* (2013.01)

(58) Field of Classification Search
CPC ... H04J 14/0212; H04B 3/52; H04Q 11/0005; H04Q 11/0062; H04Q 2011/0016
(Continued)

(56) References Cited

U.S. PATENT DOCUMENTS

| | | | | |
|---|---|---|---|---|
| 6,173,093 B1* | 1/2001 | Jeal | ...................... | H04J 14/0221 385/24 |
| 6,208,441 B1* | 3/2001 | Jones | .................. | H04J 14/0201 385/24 |

(Continued)

FOREIGN PATENT DOCUMENTS

WO 2011009341 A1 1/2011

OTHER PUBLICATIONS

P. N. Ji, R. Aida, and T. Wang, "Submarine Reconfigurable Optical Add/Drop Multiplexer with Passive Branching Unit", U.S. Appl. No. 61/863,005, filed Aug. 7, 2013.

(Continued)

*Primary Examiner* — Juan A Torres
(74) *Attorney, Agent, or Firm* — Joseph Kolodka

(57) ABSTRACT

A method for data transport that includes providing a branch terminal between a first and second trunk terminal, wherein a branching unit is present at an intersect between the first and second trunk terminal and the branch terminal. The branching unit includes a reconfigurable add/drop multiplexers (ROADM) at least one attenuator. A signal is sent from a second terminal of the first and second trunk terminal to the branding unit. The signal may include a branch traffic component trunk traffic component. The branching unit includes at least one attenuator for attenuating the trunk traffic component so that the trunk traffic component of the signal cannot be detected at the branch terminal.

20 Claims, 6 Drawing Sheets

(51) Int. Cl.
 *H04Q 11/00* (2006.01)
 *H04B 3/52* (2006.01)
(58) Field of Classification Search
 USPC .......................................................... 398/49
 See application file for complete search history.

(56) References Cited

U.S. PATENT DOCUMENTS

| | | | | |
|---|---|---|---|---|
| 6,310,994 | B1* | 10/2001 | Jones | G02B 6/2932 385/24 |
| 7,899,334 | B2* | 3/2011 | Zhong | H04J 14/0204 398/157 |
| 2010/0008672 | A1* | 1/2010 | Kovsh | H04J 14/0204 398/85 |
| 2010/0290786 | A1* | 11/2010 | Abbott | H04J 14/0204 398/79 |
| 2011/0026925 | A1* | 2/2011 | Mu | H04J 14/0257 398/79 |
| 2011/0135310 | A1* | 6/2011 | Kovsh | H04J 14/0221 398/83 |
| 2011/0200322 | A1* | 8/2011 | Kovsh | H04J 14/0209 398/2 |
| 2012/0114332 | A1* | 5/2012 | Zhang | H04J 14/0204 398/48 |
| 2012/0114335 | A1 | 5/2012 | Marcerou et al. | |
| 2012/0121267 | A1 | 5/2012 | Wang et al. | |
| 2013/0259055 | A1 | 10/2013 | Ji et al. | |

OTHER PUBLICATIONS

P. N. Ji, R. Aida, and T. Wang, "Secure WSS-Based Reconfigurable Branching Unit for Submarine Network", U.S. Appl. No. 61/885,566, filed Oct. 2, 2013.

P. N. Ji, R. Aida, and T. Wang, "Secure WSS-based Reconfigurable Branching Unit with Single Branch Fiber Pair", U.S. Appl. No. 61/891,957, filed Oct. 17, 2013.

* cited by examiner

MECHANISM FOR TRAFFIC PRIVACY IN RECONFIGURABLE ADD/DROP MULTIPLEXER BASED SUBMARINE NETWORKS

RELATED APPLICATION INFORMATION

This application claims priority to provisional application Ser. No. 62/028,873 filed on Jul. 25, 2014.

BACKGROUND

Technical Field

The present invention relates to submarine networks, and more particularly to providing security in submarine networks.

Description of the Related Art

Submarine optical networks form the backbone of global communication networks, and generally include main trunks that connect trunk terminals (e.g., point-to-point cable links with in-line optical amplifiers to boost the signal power), and branch paths which connect to other branch terminals. A branching unit (BU) is a network element that splits the signal between the main trunk and the branch path and vice versa. This allows the signals from different paths to share the same fiber instead of installing dedicated fiber pairs for each link. BUs generally perform signal splitting and combining functions optically, and thus the BU has a similar function as an optical add/drop multiplexer (OADM) in terrestrial wavelength division multiplexing (WDM) networks.

SUMMARY

A method for data transport is provided that includes a submarine network. In some embodiments, a method of data transport is provided that uses one or more secure reconfigurable branching units. In some embodiments, a method for data transport is provided that includes providing a network including at least one branch terminal and at least one trunk terminal, wherein a branching unit is present at an intersect between the at least one trunk terminal and the at least one branch terminal. The branching unit may include a reconfigurable add/drop multiplexers (ROADM) and at least one attenuator. A signal is sent from a sending terminal of the at least one truck terminal to the branching unit, in which the signal includes a branch traffic component and a trunk traffic component. The trunk traffic portion is removed from the signal by the reconfigurable add/drop multiplexers (ROADM), and the trunk traffic portion is then attenuated with the attenuator at the branching unit. The attenuated trunk traffic portion may then be combined with the signal being sent to the branch terminal from the sending terminal so that the trunk traffic portion of the signal that is combined with the attenuated trunk traffic portion of the signal cannot be detected by the branch terminal.

In another embodiment of the present disclosure, a branch unit is provided for use with a submarine network that includes an interface for positioning the branch unit between at least a first trunk terminal and a second trunk terminal, wherein the interface is connected to at least one branch terminal. The branch unit further includes at least one reconfigurable add/drop multiplexers (ROADM) sub unit filter for removing a trunk traffic portion from a signal received by the branch unit from one of the first and second trunk terminals. The signal may include the trunk traffic portion and an additional branch traffic portion. The branch unit may further include an attenuator for attenuating the trunk traffic portion of the signal that is removed from the signal by the at least one reconfigurable add/drop multiplexers (ROADM) sub unit filter. The branch unit may further include a coupler for combining an attenuated trunk traffic portion produced by the attenuator with the signal including said trunk traffic portion and said branch traffic portion before transmitting said signal from said branch unit to said branch station. The trunk traffic portion of the signal that is combined with the attenuated trunk traffic portion of the signal cannot be detected by the branch terminal.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
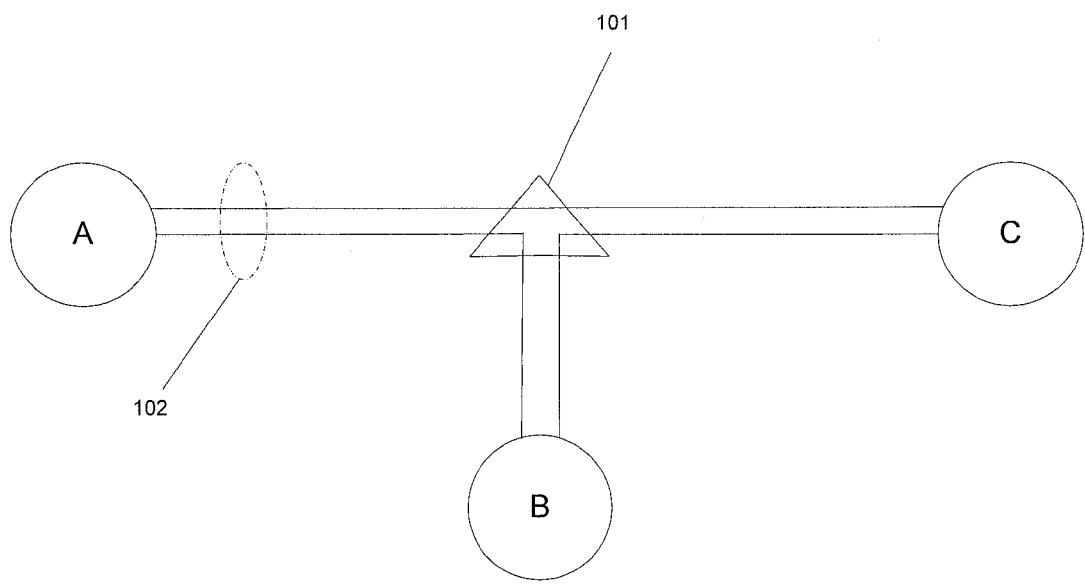
FIG. 1 is a schematic of a branching unit (BU) in a submarine network.

The present disclosure provides traffic security in submarine networks with multiple stations connected through branching units (BUs) equipped with reconfigurable add/drop multiplexers (ROADM). Submarine networks, usually use traffic wavelengths as loading channels to preserve the performance of the submarine repeaters in the segment that goes from the branching unit to the branch station. This can simplify the complexity of the submersible equipment. However, these wavelengths carry traffic that is not intended to that branch station. In some embodiments of the present disclosure, a method and system are provided to convert the traffic wavelength into dummy channels inside the branching unit. In some embodiments, this provides that the wavelengths cannot be detected at any unintended station.

Data scrambling in the branching unit is one security measure for use with submarine networks, however this type of security requires two additional filters, i.e., a multi-plexer and de-multi-plexer, for each direction, which results in a high hardware cost for the system.

There have also been other branching unit (BU) architectures that do not use broadcast-and-select configuration. These branching unit (BU) architectures that do not use broadcast and select configurations each wavelength (signal channel) will only be sent to the intended terminal and not leaked to unintended ones. These architectures included filter-based architecture, switch-based architecture, inter-level-based architecture, and wavelength-selective switch (WSS)-based architectures. These architectures require major modification of the existing branching unit (BU) and therefore typically cannot be implemented easily.

The methods and systems of the present disclosure use a broadcast and select configuration. As used herein, the term "broadcast-and-select" as used herein, means a network employing a broadcast select architecture. In the broadcast-and-select architecture, splitters broadcast the multi-wavelength input signal to multiple outputs and optical filters select the appropriate wavelength or wavelengths that is to be dropped. Broadcast-and-select optical add/drop multiplexer (OADM) use splitters to broadcast the entire multi-wavelength input signal entering the node to every drop port and the through-path. Optical filters select the wavelengths to be dropped at each output. These devices can be simple fixed filters or tunable filters, single channel filters or band filters, depending on the flexibility required at the add/drop port.

A method and system is disclosed herein to convert traffic wavelengths into dummy channels. As will be discussed in greater detail, the conversion can be done by coherent super position with a delayed and attenuated copy of the signal. The methods and systems provided herein typically do not require major modification to the existing branching unit (BU) architecture, and may only require some additional splitter/coupler and attenuator. The methods and systems provided in the present disclosure provide a solution to telecom carriers that employ large submarine networks employing broadcast and select architectures that demand enhanced privacy and security in comparison to existing technologies.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A large percentage of transcontinental data traffic is supported by submarine cable systems equipped with multiple pairs of optical fibers. One key element in modern submarine networks is the branching unit (BU). The BU divides the transmission path and provides connections among multiple stations. FIG. 1 shows a conceptual diagram of a branching unit (BU) 101, where, for simplicity, one branch is assumed. In the branching unit (BU) that is depicted in FIG. 1, the trunk stations are identified as "A" and "C", whereas "B" is the branch station. The branching unit (BU) 101 depicted in FIG. 1 is a passive branching unit (BU). FIG. 1 shows the most elemental BU configuration where the fiber pairs 102 are separated between trunk traffic AC and branch traffic AB. In the submarine wavelength-division multiplexing (WDM) systems of some embodiments of the present disclosure, the traffic can be also managed at the wavelength level by using Branching units (BU) based on Reconfigurable Optical Add/Drop Multiplexing (ROADM).

Figure 2:
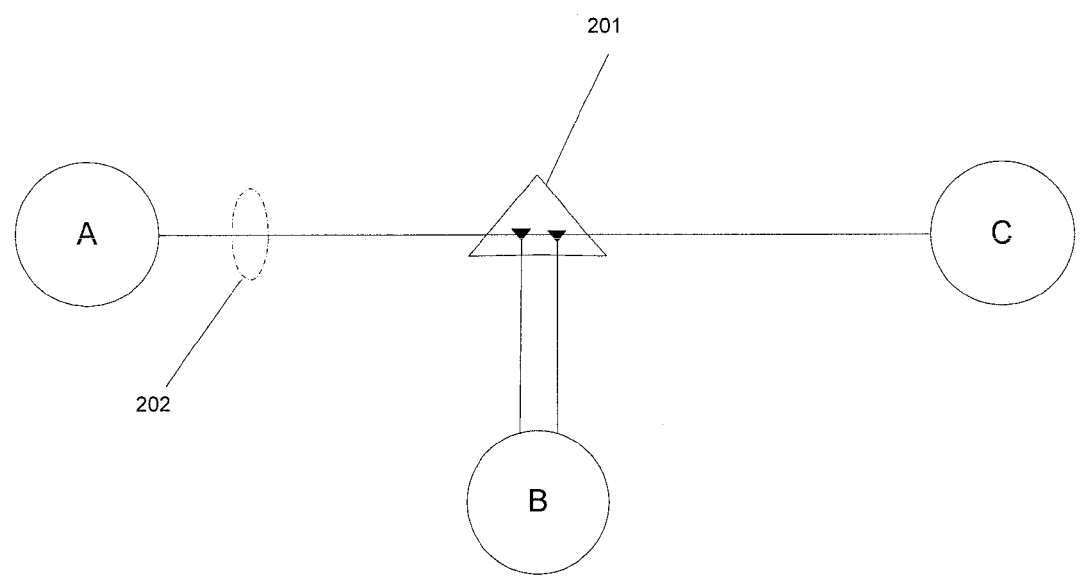
FIG. 2 is a schematic of a reconfigurable optical add/drop multiplexing (ROADM) branding unit (BU) in a submarine network, in accordance with one embodiment of the present disclosure.

FIG. 2 depicts one example of a Reconfigurable Optical Add/Drop Multiplexing (ROADM) Branching Unit (BU) where, for simplicity, one branch is assumed. In FIG. 2, a basic schematic of an ROADM branching unit 201 is depicted, in which the connections between AB and between BC (branch traffic) use a portion of the transmission spectrum, whereas the connection between AC, i.e., for trunk traffic, uses a different portion of the spectrum. In the ROADM BU 201 depicted in FIG. 2, a ROADM fiber pair is identified by reference number 202. In this notation, the first letter corresponds to origin and the second letter corresponds to destination. At the ROADM BU 201, the wavelengths corresponding to AB are dropped and the wavelengths corresponding BC are added. Therefore, the ROADM BU is equipped with ROADM Sub-Units (RSUs), which perform reconfigurable optical filtering operations to enable a flexible re-utilization of the optical spectrum.

Figure 3:
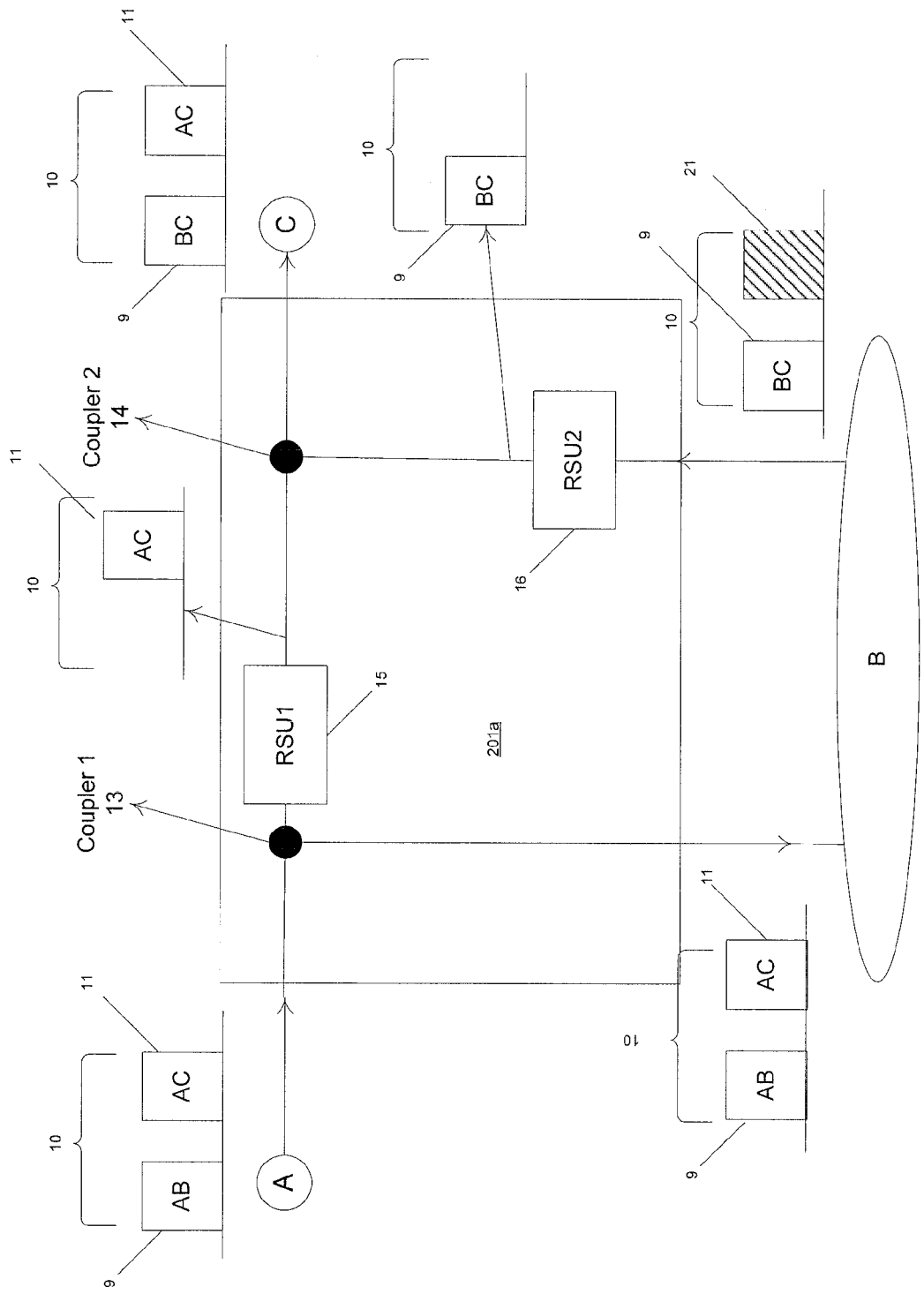
FIG. 3 is a block diagram/schematic illustrating the principle of optical add/drop multiplexing in a submarine branching unit (BU) consistent with FIG. 2, in which the direction of traffic is only depicted in the eastbound direction.

One embodiment of the ROADM principle is depicted in FIG. 3. FIG. 3 illustrates the principle of optical add/drop multiplexing in a submarine branching unit (BU) 201a consistent with FIG. 2, in which the direction of traffic is only depicted in the eastbound direction. The apparatus depicted in FIG. 3 includes trunk stations A, C, a branch station B, optical couplers (which are essentially the same as optical splitters), i.e., coupler 1 (identified by reference number 13), and coupler 2 (identified by reference number 14), and reconfigurable optical add/drop multiplexing sub units, e.g., RSU1 (identified by reference number 15) and RSU2 (identified by reference number 16). In the example depicted in FIG. 3, the spectrum 10 is divided in two bands. The band on the left side, is reserved for branch traffic 9, i.e. AB and BC, whereas the band on the right side is reserved to trunk traffic 11, i.e., AC. A similar diagram would be typical for westbound traffic. At the ROADM BU, the AB wavelengths 9 are dropped to their destination together with the AC wavelengths 11, which act as dummy channels to preserve the optical power density and, therefore, the normal operation of the submarine repeaters. At station B, the BC wavelengths 9 are launched together with dummy channels 21, again to preserve the optical power density. The ROADM Sub-Unit identified by reference number 16, i.e., having the notation RSU2, removes the dummy channels 21, and coupler 2 (identified by reference number 14) adds the AC and BC bands 11, 9 towards C station.

Figure 4:
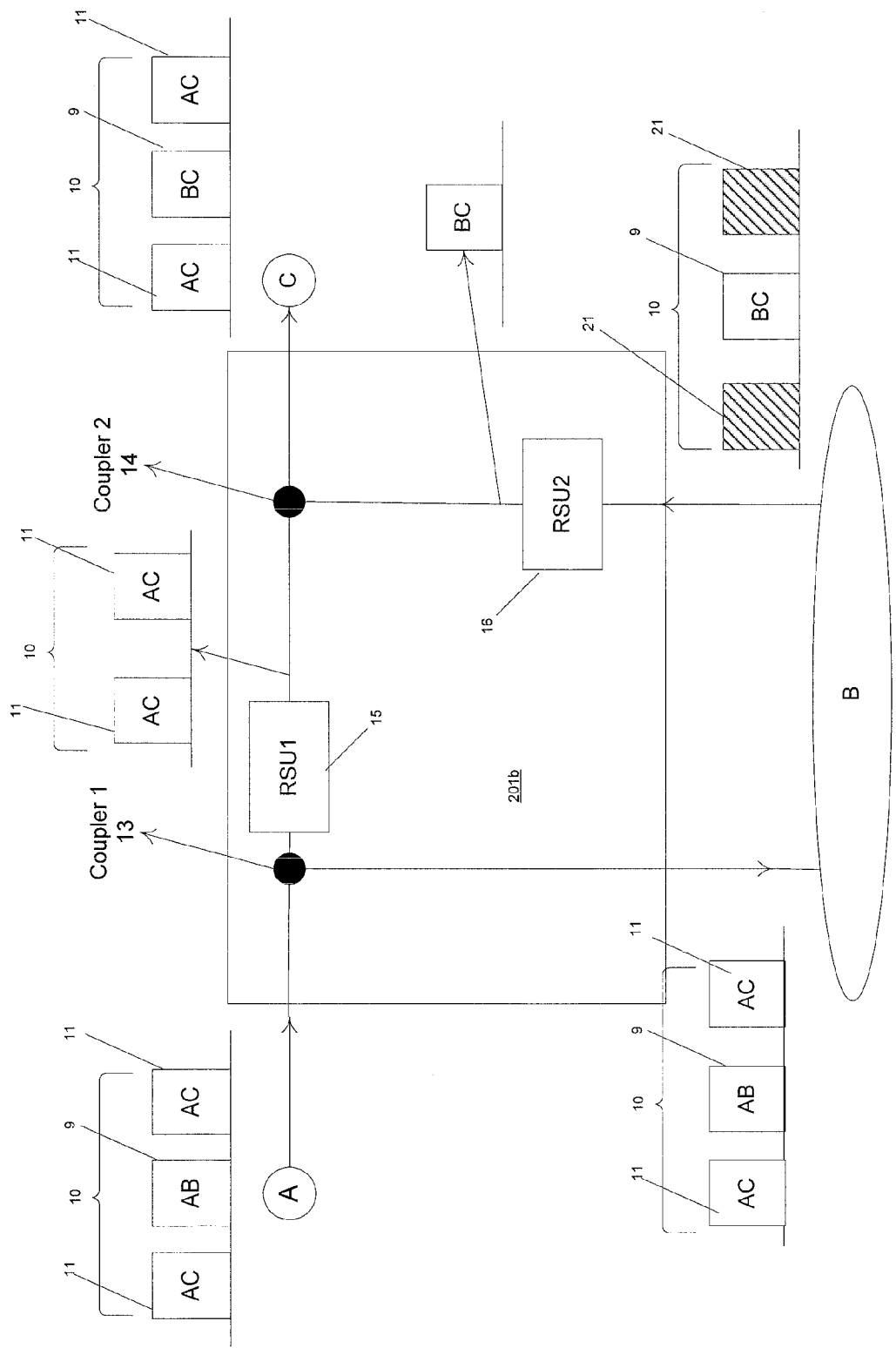
FIG. 4 is a block diagram/schematic illustrating one embodiment of a principle of optical add/drop multiplexing in a submarine branching unit with a different bandwidth assignment for branch and trunk traffic.

To illustrate the "Reconfigurable" character of the ROADM-BU, FIG. 4 shows a similar diagram of FIG. 3, but with a different band assignment configuration. FIG. 4 depicts one embodiment of a principle of optical add/drop multiplexing in a submarine branching unit 201b with a different bandwidth assignment for branch and trunk traffic. FIGS. 3 and 4 illustrate two different configurations of traffic that can be reconfigured by sending a command to the ROADM-BU from the terminal stations A, C. In some embodiments, this provides the necessary flexibility to adapt to changes on capacity requirements for trunk AC traffic 11 and branch traffic AB, BC 9.

In the embodiment depicted in FIG. 4, the reconfigurable optical add/drop multiplexing sub units, e.g., RSU1 (identified by reference number 15) and RSU2 (identified by reference number 16) perform a filter operation that can be reconfigured depending of the information provided from a command signal sent from the terminal stations, e.g., A, C. The RSUs are capable of performing filtering with variable center frequency and variable filter bandwidths across the entire transmission spectrum. Different technologies can be employed to achieve this operation. In some embodiments, an RSU, e.g., RSU 1 (identified by reference number 15) and RSU 2 (identified by reference number 16), can consist of a set of passive filters and switches or it can be based on Wavelengths Selective Switch (WSS).

In some embodiments, referring to FIGS. 3 and 4, in which FIG. 3 represents the traffic configuration at the beginning of life of the cable system, the reconfigurable optical add/drop multiplexing sub units, e.g., RSU1 (identified by reference number 15) and RSU2 (identified by reference number 16) perform filtering operations that remove the AB band 9 and the dummy channels respectively. In a second stage, the cable owners may decide to change the wavelength number and location assigned to each station. Thus, as an example, a command signal is sent to the ROADM-BU 201b and the RSU1 and RSU2 are reconfigured as shown in FIG. 4. Now, the location and size of the band corresponding to AB/BC 9 traffic is changed and the filtering operations of RSUs have changed accordingly.

FIGS. 3 and 4 depict some embodiments of the fundamental operation of a ROADM-BU 201a, 201b for the traffic management and wavelength assignment in a submarine cable system. In some embodiments, the coupler identified by reference number 13, i.e., coupler 1, splits the whole band 10 (including AC traffic 11) and the whole band is directed to station B. The AC traffic 11 is not intended to station B, but can be transmitted to station B to preserve these wavelengths in order to maintain the total optical power and the power spectral density. In this manner, the submarine repeaters can operate normally. However, because AC wavelengths are not intended for the B station, such signals are not detected at B station. But, it can be possible to detect the traffic if transponders are installed and tuned to these wavelengths.

Figure 5:
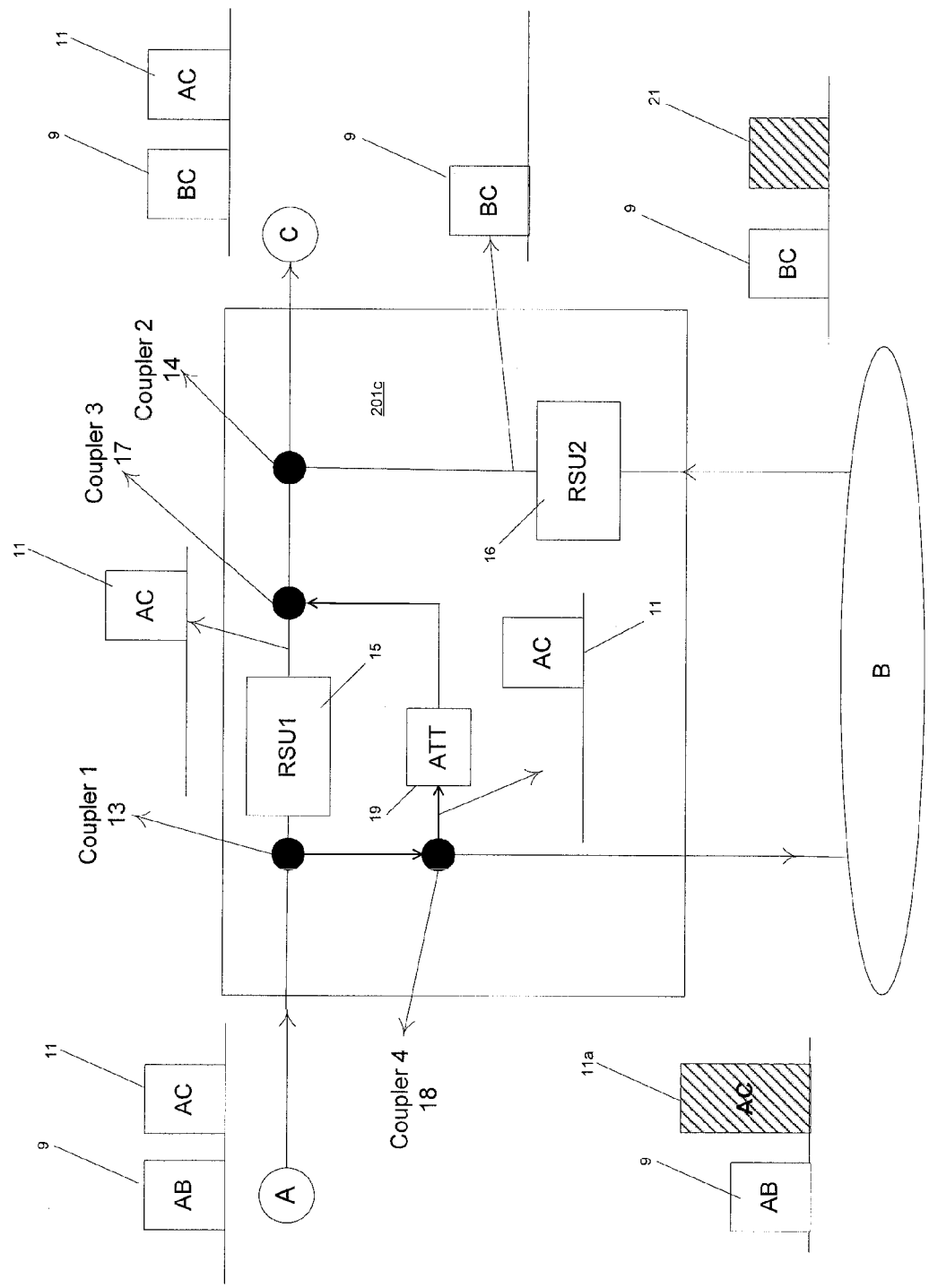
FIG. 5 is a block diagram/schematic illustrating reconfigurable add/drop multiplexers (ROADM) branching unit (BU) principles with a traffic-to-dummy conversion for traffic privacy with the band assignments depicted in FIG. 3, in accordance with one embodiment of the present disclosure.

In some embodiments, in order to preserve the privacy of AC traffic 11, and prevent eavesdropping but, at the same time, use AC wavelengths 11 as loading channels, this patent application proposes a "traffic-to-dummy" conversion at the ROADM-BU 201c, as depicted in FIG. 5. FIG. 5 depicts one embodiment of the ROADM BU principle with traffic-to-dummy conversion for traffic privacy with the band assignment shown in FIG. 3. FIG. 5 depicts the operation principle for traffic privacy, in accordance with one embodiment of the present disclosure.

Referring to FIG. 5, in some embodiments, before coupler 1 directs the whole transmission band 10 to station B, and after the RSU1, the AB band 9 is removed and only the AC wavelengths 11 remain. In this embodiment, an additional coupler, i.e., coupler 3 (identified by reference number 17), is placed after the reconfigurable optical add/drop multiplexing sub unit identified by reference number 15 having the notation RSU1. This coupler 17 sends the AC traffic 11 to an optical attenuator 19 and the attenuated AC wavelengths are combined in coupler 4 (identified by reference number 18 with the original input signal (9 and 11) coming from coupler 1 (identified by reference number 13) towards station B. As used herein, the term "optical attenuator" or simply "attenuator" denotes an optical device that reduces the power of an optical signal without appreciably distorting its waveform. The signal traveling to station B is now composed of AB traffic and wavelengths converted to dummy light 11a. Here the dummy light 11a is a combination of the attenuated AC wavelengths from the attenuator and the AC wavelengths from coupler 1, in which they are combined at coupler 4. The traffic to dummy conversion is the consequence of the mixing of AC wavelengths coming from coupler 1 (identified by reference number 13) and attenuated AC wavelengths from coupler 3 (identified by reference number 17). In some embodiments, the optical path between coupler 3 and coupler 4 should be sufficient to de-correlate the AC signal. In some embodiments, adding the de-correlated copy of the signal to the signal itself creates enough crosstalk (XT) to prevent the successful decoding of the data with any receiver. Therefore, the AC traffic has been effectively converted to dummy channels and it is effectively undetectable at station B, ensuring traffic privacy.

The amount of crosstalk required to prevent data decoding can be controlled by an attenuator 19. In some embodiments, depending of the location of the ROADM BU and the Optical Signal-to-Noise-Ratio (OSNR) of the AC wavelengths, different crosstalk levels can be required to achieve data privacy. This parameter can be, therefore, optimized for each case. Moreover, the crosstalk induced to AC traffic, creates small power imbalance for the transmission path between the ROADM-BU 201c and the station B. This power imbalance can depend on the configuration of the bands (the ratio between the bandwidth allocated for branch traffic and the bandwidth allocated for trunk traffic) and the crosstalk. After obtaining the power imbalance, the OSNR penalty caused to the AB traffic due to the crosstalk induced to the AC traffic can be estimated and properly accounted in the performance budget.

It is clear from FIG. 5 that any configuration change on the band assignment can also be subject to traffic privacy.

Figure 6:
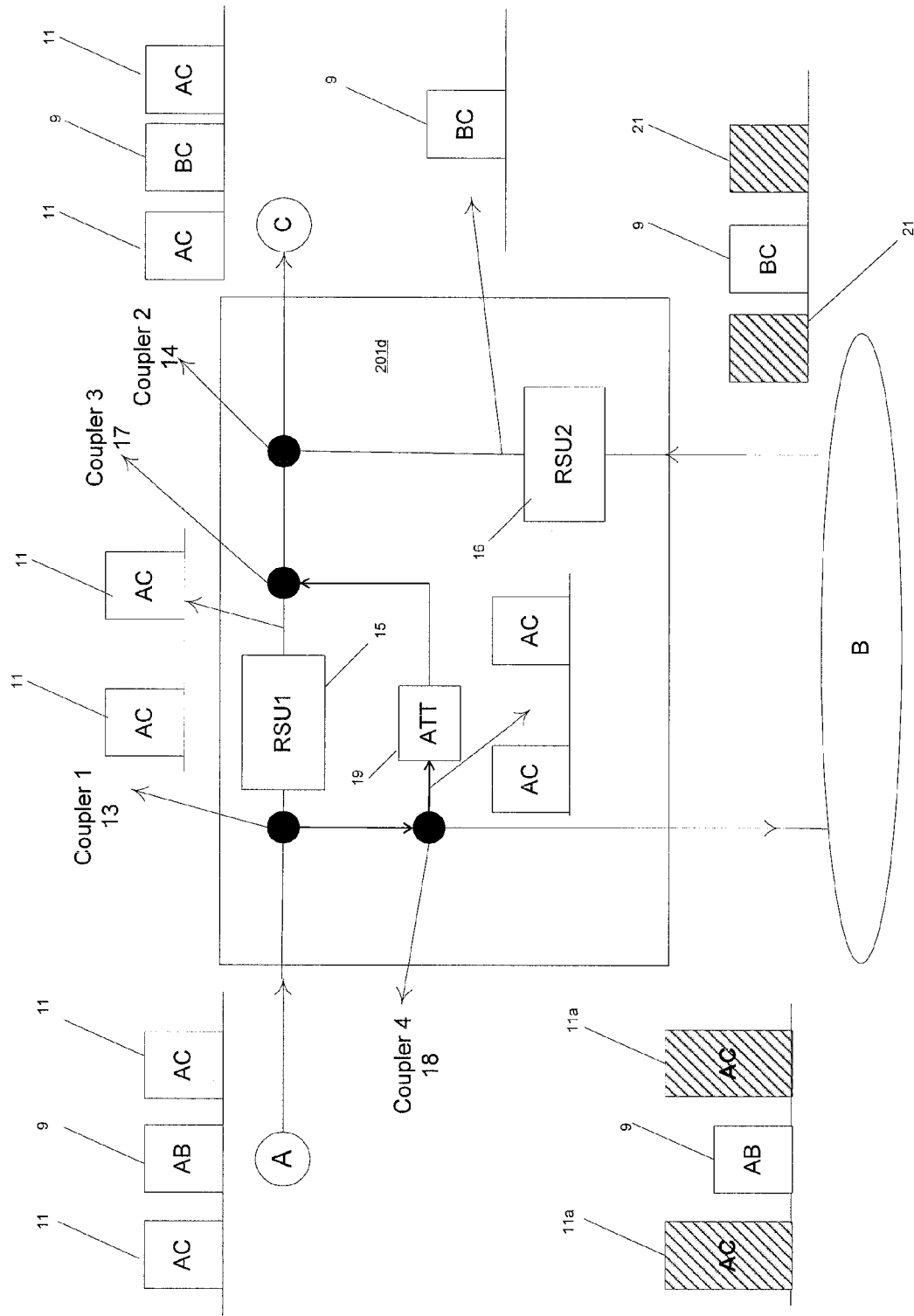
FIG. 6 is a block diagram/schematic illustrating the ROADM BU principle with a traffic-to-dummy conversion for traffic privacy with the band assignment shown in FIG. 4, in accordance with one embodiment of the present disclosure.

FIG. 6 shows the traffic privacy operation in the case that the traffic band assignment shown in FIG. 4. This traffic privacy design can also be used for submarine BU with fixed add/drop (such as using fixed filter) or limited add/drop configurations (such as using tunable filter, or filter array). This mechanism for traffic privacy may therefore be fully compatible with ROADM operations and therefore independent of the bandwidth assignment selected during the lifetime of the cable system.

In some embodiments, the methods, systems and apparatus provided by the present disclosure can provide a submarine branching unit architecture configuration that ensures privacy in the data delivery. Compared with branching unit architecture prior to the teaching of the present disclosure, the branching unit architecture has a new sub-structure that consists of a first additional coupler, i.e., coupler 3 (identified by reference numbers 17 in FIGS. 5 and 6), after the reconfigurable optical add/drop multiplexing sub unit, i.e., RSU 1 (identified by reference number 15), and attenuator 19. The sub-structure of the branching unit architecture of the present disclosure may also include another additional coupler, i.e., coupler 4 (identified by reference number 18). As illustrated in FIGS. 5 and 6, coupler 3 taps the AC (trunk to trunk) traffic to the attenuator 19. The attenuator 19 attenuates the AC wavelength. It controls the amount of crosstalk required to prevent data decoding. The crosstalk level is optimized for different system settings (such as the location of the ROADM BU 201c, 201d and the OSNR of the AC wavelengths). The second new coupler (coupler 4) combines the attenuated signal with the signal coming from coupler 1 towards branch station B.

The optical path between coupler 3 and coupler 4 is set to be sufficient to de-correlate the AC signal. Adding a de-correlated copy of the signal to the signal itself creates enough cross-talk to prevent the successful decoding of the data with a receiver. Therefore, in some embodiments, the AC traffic that is sent towards the branch station B has been effectively converted to dummy channels 11a, and it is effectively undetectable at branch station B, which can ensure traffic privacy.

After obtaining the power imbalance caused by the cross-talk induced to AC traffic, the Optical Signal-to-Noise-Ratio (OSNR) penalty caused to the AB traffic due to the crosstalk induced to the AC traffic is estimated and properly accounted in the performance budget. The wavelength band for traffic privacy operation can be reconfigured using the ROADM-BU 201c, 201d.

Figure 7:
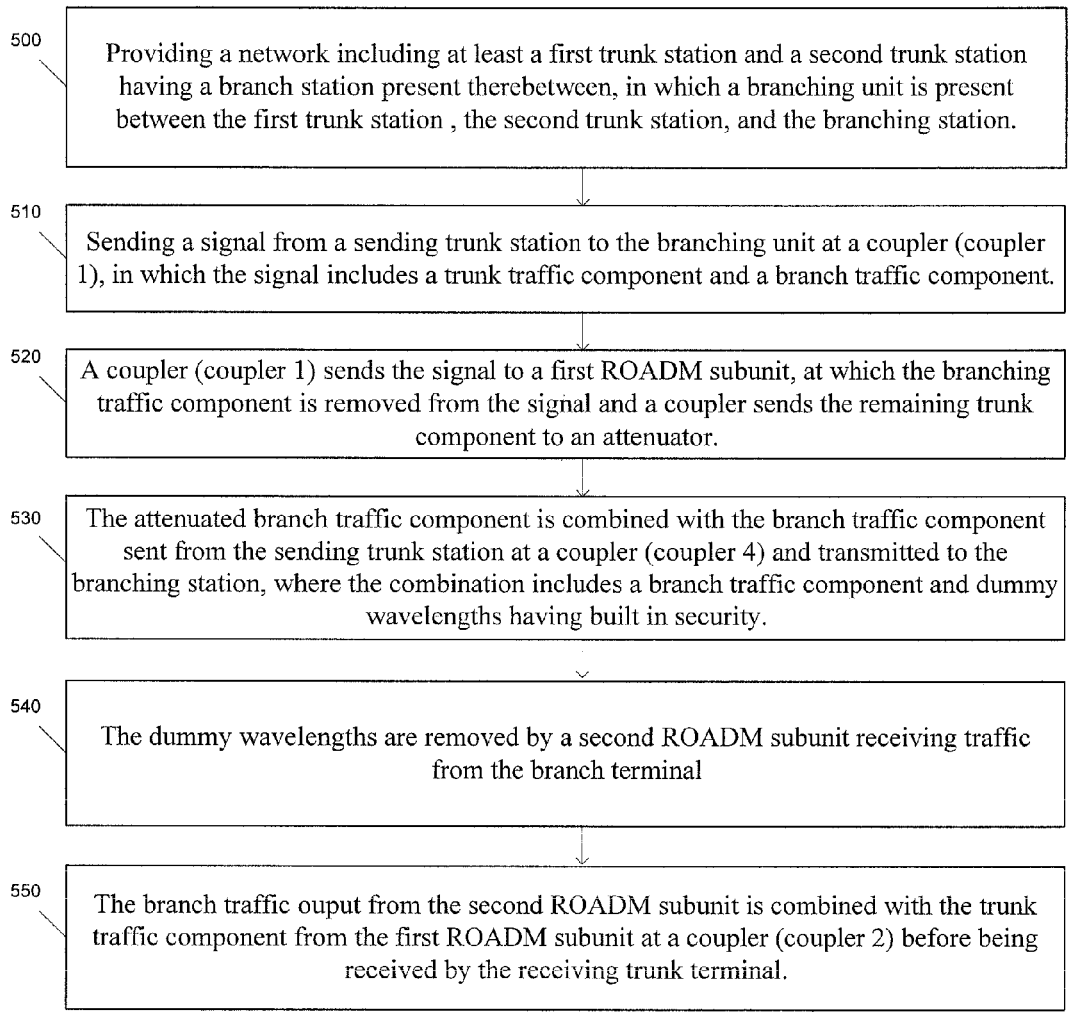
FIG. 7 is a block diagram/flow chart of a system and method for increasing security in submarine networks, in accordance with the present disclosure.

In one embodiment, a method is provided for increasing security in submarine networks, as depicted in FIG. 7. The method may begin at step 500 with providing a network including at least a first trunk station A and a second trunk station C having a branch station B present therebetween. A branching unit BU 201c, 201d is present between the first trunk station A, the second trunk station B, and the branching station B, as described above with reference to FIGS. 5 and 6. A signal is sent from a trunk station, e.g., station A. The signal includes a trunk traffic component 11, e.g., AC, and a branch traffic component 9, e.g. AB. The signal is sent to the branching unit 201c, 201d at step 510 of the method depicted in FIG. 7. Referring to FIGS. 5,6 and 7, at step 520 of the method, before the entire signal is transmitted to the branch station B, a first reconfigurable optical add/drop multiplexing sub units (RSU1) removes the trunk signal component 11, e.g., AB, wherein the branch signal component 9 remains and is sent to the attenuator by coupler 3. Referring to step 530, the attenuated branch traffic component is combined with the branch traffic component sent from the sending trunk station at a coupler (coupler 4) and transmitted to the branching station B, where the combination 11a includes a branch traffic component and dummy wavelengths having built in security.

In a following process step, the dummy wavelengths 21 from branching station B are removed by a second ROADM subunit 16 receiving traffic from the branch terminal B at step 540. Referring to step 550 of the process flow depicted in FIG. 7, the branch traffic output from the second ROADM subunit 16 is combined with the trunk traffic component from the first ROADM subunit 15 at a coupler (coupler 2) before being received by the receiving trunk terminal.

In some embodiments, the methods and systems that are disclosed herein employ a tap-decorrelate-combine method to convert the unintended signal into dummy signal, which provides for greater security measures in submarine networks. In some embodiments, the present disclosure provides for the insertion of a dummy conversion unit into a branch unit (BU) architecture. In some embodiments, the methods and systems disclosed herein provide for the combination of ROADM Sub-Units (RSUs) and the dummy light conversion sub-system to achieve traffic privacy while keeping the branch units add/drop operation reconfigurable. The optimization of attenuator crosstalk for different network settings. The estimation of the Optical Signal-to-Noise-Ratio (OSNR) penalty caused to the AB traffic due to the crosstalk induced to the AC traffic.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for data transport comprising:
providing a network including at least one branch terminal and at least one trunk terminal, wherein a branching unit is present at an intersect between the at least one trunk terminal and the at least one branch terminal, the branching unit including a reconfigurable add/drop multiplexers (ROADM) sub unit and at least one attenuator;
sending a signal from a sending trunk terminal of the at least one trunk terminal to the branching unit, the signal including a branch traffic component and a trunk traffic component;
removing the trunk traffic portion from the signal with the reconfigurable add/drop multiplexers (ROADM) sub unit filter, and attenuating the trunk traffic portion with the attenuator at the branching unit; and
combining an attenuated trunk traffic portion with the signal being sent to the branch terminal from the sending terminal so that the trunk traffic portion of the signal that is combined with the attenuated trunk traffic portion of the signal cannot be detected by the branch terminal.

2. The method of claim 1, wherein the network is a submarine network.

3. The method of claim 1, wherein the branching unit comprises a broadcast and select architecture.

4. The method of claim 1, wherein each of said at least one reconfigurable optical add/drop multiplexing sub unit comprise a set of passive filters and switches, or said at least one reconfigurable optical add/drop multiplexing sub unit comprises wavelengths selective switch (WSS).

5. The method of claim 1, wherein the least one trunk terminal includes said sending trunk terminal and a receiving trunk terminal, wherein the branch terminal is positioned therebetween and connected to each of the sending trunk terminal and the receiving trunk terminal by the branching unit.

6. The method of claim 5, wherein the branch unit comprises a plurality of couplers including a first coupler connected to the sending trunk terminal and the reconfigurable add/drop multiplexers (ROADM) sub unit filter, a second coupler connected to the branching terminal and the receiving trunk terminal; a third coupler connected to the reconfigurable add/drop multiplexers (ROADM) sub unit filter and the second coupler; and a fourth coupler connected to the first coupler, the attenuator and the branch station.

7. The method of claim 6, wherein the third coupler sends the trunk traffic component of the signal to the attenuator, wherein attenuated wavelengths of the trunk traffic component are combined at the fourth coupler with the signal transmitted from the first coupler towards the branch station, wherein following combining at the fourth coupler a signal traveling to the branch station includes the branch traffic component and wavelengths converted to dummy light.

8. The method of claim 7, wherein the wavelengths converted to the dummy light result from mixing of the trunk traffic component of the signal from the first coupler mixing with said attenuate wavelengths from said third coupler.

9. The method of claim 8 further comprising an additional reconfigurable add/drop multiplexers (ROADM) sub unit filter present between the branch station and the second coupler.

10. The method of claim 9, wherein the additional reconfigurable add/drop multiplexers (ROADM) sub unit filter removes the dummy light.

11. The method of claim 10, wherein at the second coupler the trunk traffic component from the reconfigurable add/drop multiplexers (ROADM) sub unit filter connected to the first coupler is combined with a branch traffic component from additional reconfigurable add/drop multiplexers (ROADM) sub unit filter to provide a transmitted signal to a receiving trunk station.

12. A branch unit for use with a submarine network comprising:
an interface for positioning the branch unit between at least a first trunk terminal and a second trunk terminal, wherein the interface is connected to at least one branch terminal;
at least one reconfigurable add/drop multiplexers (ROADM) sub unit filter for removing a trunk traffic portion from a signal received by the branch unit from one of the first and second trunk terminals, the signal including said trunk traffic portion and a branch traffic portion;
an attenuator for attenuating the trunk traffic portion of the signal that is removed from the signal by the at least one reconfigurable add/drop multiplexers (ROADM) sub unit filter; and
a coupler for combining an attenuated trunk traffic portion produced by the attenuator with the signal including said trunk traffic portion and said branch traffic portion before transmitting said signal from said branch unit to said branch station, wherein said trunk traffic portion of the signal that is combined with the attenuated trunk traffic portion of the signal cannot be detected by the branch terminal.

13. The branch unit of claim 12, wherein the branching unit comprises a broadcast and select architecture.

14. The branch unit of claim 12, wherein each of said at least one reconfigurable optical add/drop multiplexing sub unit comprise a set of passive filters and switches, or said at least one reconfigurable optical add/drop multiplexing sub unit comprises wavelengths selective switch (WSS).

15. The branch unit of claim 12, wherein the first trunk terminal is a sending trunk terminal and said second trunk terminal is a receiving trunk terminal.

16. The branch unit of claim 15 further comprising a first coupler connected to the sending trunk terminal and the reconfigurable add/drop multiplexers (ROADM) sub unit filter, a second coupler connected to the branching terminal and the receiving trunk terminal; a third coupler connected to the reconfigurable add/drop multiplexers (ROADM) sub unit filter and the second coupler; and a fourth coupler connected to the first coupler, the attenuator and the branch station.

17. The branch unit of claim 16, wherein the third coupler sends the trunk traffic component of the signal to the attenuator, wherein attenuated wavelengths of the trunk traffic component are combined at the fourth coupler with the signal transmitted from the first coupler towards the branch station, wherein following combining at the fourth coupler a signal traveling to the branch station includes the branch traffic component and wavelengths converted to dummy light.

18. The branch unit of claim 17, wherein the wavelengths converted to the dummy light result from mixing of the trunk traffic component of the signal from the first coupler mixing with said attenuate wavelengths from said third coupler.

19. The branch unit of claim 18 further comprising an additional reconfigurable add/drop multiplexers (ROADM) sub unit filter present between the branch station and the second coupler.

20. The branch unit of claim 19, wherein the additional reconfigurable add/drop multiplexers (ROADM) sub unit filter removes the dummy light.

* * * * *